Sept. 18, 1928.

R. BEARDSLEY

METHOD OF AND APPARATUS FOR FORMING ARTICLES

Filed Nov. 30, 1923 2 Sheets-Sheet 1

Witnesses:
W. F. Kilroy
Harry R. L. White

Inventor:
Robert Beardsley
By _____ Attys

Sept. 18, 1928.　　　　　　　　　　　　　　1,684,658
R. BEARDSLEY
METHOD OF AND APPARATUS FOR FORMING ARTICLES
Filed Nov. 30, 1923　　　　2 Sheets-Sheet 2
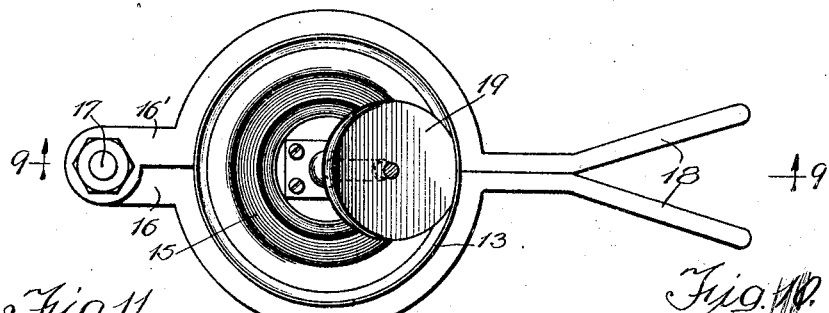
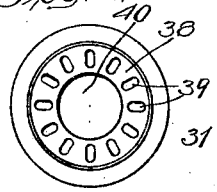
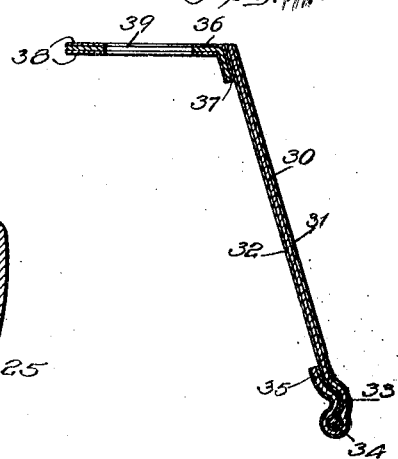
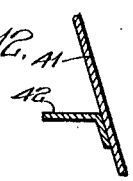
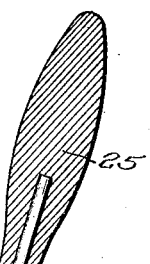
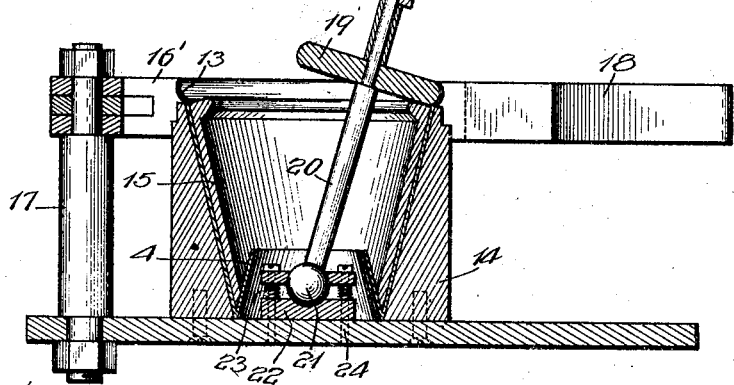

Patented Sept. 18, 1928.

1,684,658

UNITED STATES PATENT OFFICE.

ROBERT BEARDSLEY, OF CHICAGO, ILLINOIS.

METHOD OF AND APPARATUS FOR FORMING ARTICLES.

Application filed November 30, 1923. Serial No. 677,719.

My invention relates to a method of and apparatus for forming articles from parchment and the like, and more particularly to a method of and apparatus for forming articles of the character described from sheets of such material.

The invention has among its objects the production of a device of the kind described and method and apparatus for making the same, which will be simple, inexpensive, durable, reliable, satisfactory and efficient for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 8 is a top plan view of the mechanism for beading or embossing the bottom edge of the shade;

Fig. 9 is a sectional view taken substantially on line 9—9 of Fig. 8;

Fig. 10 is a sectional view of a portion of a modified shade;

Fig. 11 is a reduced top plan view of the same; and

Fig. 12 is a fragmentary sectional view illustrating another type.

Figure 1:
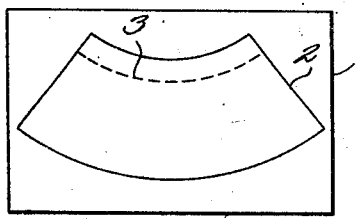
Fig. 1 is a plan view of a sheet of material from which the lamp shade blank is to be cut.

In the drawings, 1 indicates a sheet of material, such as paper, fibre-board, parchment, or the like, from which a blank 2 is to be cut in the desired size and shape. This blank in the form shown in Figs. 1–5, inclusive, for making a tapered shade, is substantially arcuate along its top and the bottom bounding edges, the end edges being straight and convergent. A scored line 3 may be formed on the blank parallel to the top arcuate edge and adjacent thereto, the distance between said arcuate edge and line 3 determining the width of the flange 4 which is to be formed on the shade. After the blank has been cut from the sheet, it is then preferably decorated or ornamented in any desired manner, as indicated at 5.

Figure 6:
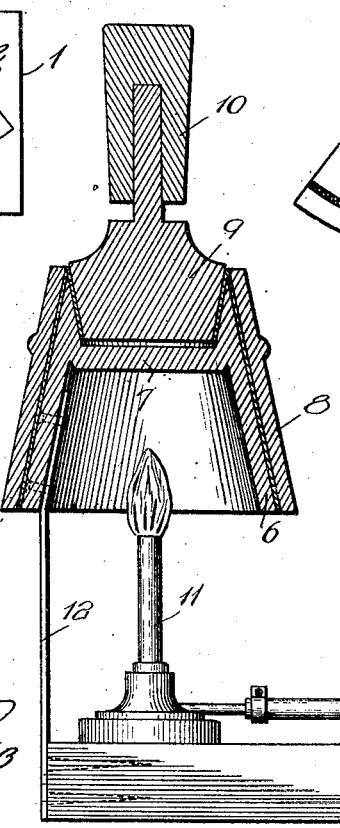
Fig. 6 is a sectional view of the mold for holding the shade while the glue or adhesive is drying.
Figure 2:
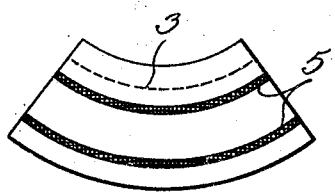
Fig. 2 shows the blank after it has been cut and ornamented.
Figure 3:
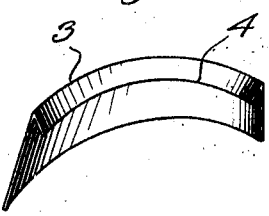
Fig. 3 shows the next step in forming the shade.

The next step in forming the shade is to fold the top edge inwardly along the scored line, as shown in Fig. 3, to form the inwardly and downwardly directed flange 4. Adhesive is then applied to one or both of the end edges of the shade and these end edges are overlapped and secured, the shade being preferably placed in a heated setting or drying mold, as shown in Fig. 6.

The setting mold shown comprises a metallic inner tubular member or shell 6 having its outer periphery tapered in the present instance so as to conform to the shape of the shade, there being a transverse or end wall 7 intermediate the top and bottom of said part 6, the same having a tapered recess or socket formed in the central top part of the member 6.

A metallic outer ring or sleeve 8, also tapered so as to conform to the shape of the shade and cooperate with the part 6, is provided and after the adhesive has been applied, as previously mentioned, with the ends of the shade overlapped, and the shade slipped over the part 6, the sleeve 8 is dropped to encircle the shade, thus holding it securely in place in the setting mold, the flange lying in the socket portion.

A ram 9, preferably of metal, with a heat-insulated handle 10, is adapted to be pressed into the socket portion of the mold to hold the flange 4 of the shade between the ram and mold. The entire mold is warmed or heated by any suitable means, as for instance, a burner 11 arranged therebelow. A bracket 12 may be employed to hold the mold a suitable distance from the burner. The shade is held in the mold a sufficient length of time to enable the adhesive to completely dry after which the ram and outer sleeve are removed and the shade taken off the part 6.

Figure 5:
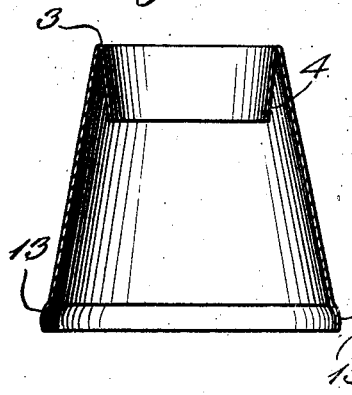
Fig. 5 is a sectional view taken substantially on line 5—5 of Fig. 4.
Figure 4:
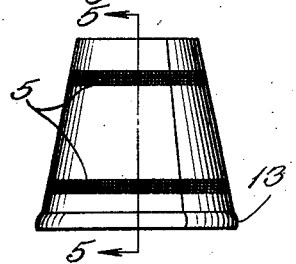
Fig. 4 shows the completed shade.

It is to be noted at this point that with the type of shade illustrated in Figs. 4 and 5, the flange 4 extends inwardly and downwardly from the top of the shade at such an angle that the line bisecting the angle between the flange and outer wall is parallel to the longitudinal or rotational axis of the shade. After taking the shade from the setting mold, it is placed in an embossing or beading mold as shown in Figs. 8 and 9, wherein the lower or large end is outwardly beaded, as at 13.

The embossing mold shown comprises a chambered part 14 having its inner wall shaped to smoothly engage the outer periphery of the shade but being slightly shorter than the shade so that the shade will project therebeyond a suitable distance. An inner sleeve 15 is removably positioned within the shade after it has been placed in the mold, this sleeve being of substantially the same length as the part 14.

A ring member, made in one or more sections, there being two parts shown, as at 16 and 16', is arranged to encircle the projecting portion of the shade, said ring member having an annular groove provided therein and into which the projecting portion of the shade is pressed or rolled.

The parts 16 and 16' are pivotally mounted upon an upright part 17 and have projecting handle portions 18, whereby they may be swung into or out of operative position and held in place during the embossing.

A roller 19 having a convex peripheral edge to cooperate with the annular groove in the ring is mounted upon a handle 20, the lower end of said handle having a ball 21 thereat, which is mounted in a spherical socket bearing 22, whereby the roller may be given a universal movement. Springs 23 may be interposed between the tightening bolts 24 of the socket bearing so that the bearing may be adjusted when desired.

After the shade has been arranged in place between the parts 14 and 15, the projecting portion 25 of the handle is grasped and rotated so that the roller 19 engages the inner periphery of the projecting portion of the shade and expands or bulges it radially outwardly into the groove formed in the ring 16—16'. This is sufficient to shape the shade at that end and form a bead thereat. The shade may then be removed from the mechanism and treated in any suitable manner, dependent upon the purpose for which it is to be used. For example, the shade may be treated with applications of oil in a suitable manner so as to render portions of it opaque and other portions translucent, whereby the shade, even though it is made of paper, will to all intents and purposes appear as if it were made of parchment. This method of treating paper stock has been fully set forth in my Patent No. 1,471,021 issued October 16, 1923.

Figure 7:
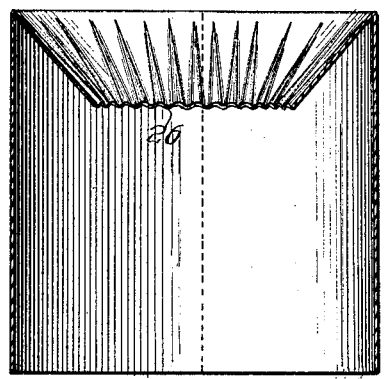
Fig. 7 illustrates another form of shade.

In the form shown in Fig. 7, the shade does not have tapered sides, but is straight. It is therefore necessary to crinkle the flange as at 26 so that it will project inwardly and downwardly of the top edge of the shade. This crinkling may be effected when blanking out as shown in Fig. 1, or at such time and with such apparatus as may be desired.

A slightly different construction is shown in Fig. 10, in which 30 represents the wall or body of the shade which is shown covered with silk or like coverings 31 and 32 secured thereto. This type is shown embossed as at 33 and bent around a ring or reinforcement 34 with the end 35 secured to the inside of the shade. In this case, a top part 36, which also may be covered as indicated at 38, is shown turned down and secured to side wall, for example, adjacent the top. For ventilation, openings 39 are shown, as will be seen by reference to Fig. 11. This shade otherwise is made substantially the same as the other one described both as to shape, ornamenting and treating.

It is adapted to be supported on a lamp or fixture at the opening 40. The figure shows the parts enlarged in order that the details may be apparent. It has been found that the body 30 when covered, as indicated, may be satisfactorily treated without injuring the shade.

In the form shown in Fig. 12, 41 represents the shade, 42 a cross partition similar to 36, which in this instance is arranged adjacent the bottom, which may of course, be constructed similar to that shown in Fig. 10 or the other figures. This type is particularly adapted for use on candle-type fixtures. I have not considered it necessary to illustrate the various types of fittings which may be used. Such additional trimmings may be attached as found desirable.

Either of the shades shown may be applied to a fixture in various number of ways, as for instance, the shade may be suspended directly upon the lamp bulb, the shade may be hung upon a bracket carried by the fixture or the bulb, or various other methods may be employed to support the same. The shades may be quickly and easily manufactured and at low cost.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In apparatus for forming articles from parchmentized material, paper and the like, a mold comprising an inner member around which a sheet of such material may be wound, said inner member having a depression in its top, a tubular shell adapted to surround said inner member and adapted to seat on said sheet, a plug removably fitting into said depression to clamp a portion of the sheet between itself and the surrounding wall of said depression, and means for heating said inner member.

2. In an apparatus of the character described, a mold including an inner tapering tubular member around which a sheet of material is wound, a transverse wall within said member intermediate its ends forming a depression in the top of said member having inwardly inclined walls, a tubular shell to surround said inner member and adapted to seat on the material around said member, a plug removably fitted into said depression to clamp a portion of the sheet between said plug and the surrounding wall of the depression, and means for heating said inner member.

In testimony whereof, I have hereunto signed my name.

ROBERT BEARDSLEY.